(12) United States Patent
Wenzel

(10) Patent No.: US 11,850,777 B2
(45) Date of Patent: Dec. 26, 2023

(54) INJECTION MOLDING AN ELEMENT ONTO A CABLE

(71) Applicant: LEONI Kabel GmbH, Roth (DE)

(72) Inventor: Jörg Wenzel, Nationalität (DE)

(73) Assignee: LEONI KABEL GMBH, Roth (DE)

( * ) Notice: Subject to any disclaimer, the term of this patent is extended or adjusted under 35 U.S.C. 154(b) by 183 days.

(21) Appl. No.: 17/434,059

(22) PCT Filed: Jan. 31, 2020

(86) PCT No.: PCT/DE2020/000007
§ 371 (c)(1),
(2) Date: Aug. 26, 2021

(87) PCT Pub. No.: WO2020/173517
PCT Pub. Date: Sep. 3, 2020

(65) Prior Publication Data
US 2022/0134617 A1  May 5, 2022

(30) Foreign Application Priority Data
Feb. 26, 2019 (DE) .......................... 102019001380.8

(51) Int. Cl.
*B29C 45/14* (2006.01)
*H01B 13/00* (2006.01)
*B29L 31/34* (2006.01)

(52) U.S. Cl.
CPC .. *B29C 45/14467* (2013.01); *B29C 45/14065* (2013.01); *B29C 45/14418* (2013.01); *B29C 45/14549* (2013.01); *H01B 13/0036* (2013.01); *B29C 2045/14934* (2013.01); *B29L 2031/3462* (2013.01)

(58) Field of Classification Search
CPC ........ B29C 45/14467; B29C 45/14065; B29C 45/14418; B29C 45/14549
See application file for complete search history.

(56) References Cited

U.S. PATENT DOCUMENTS

| | | | |
|---|---|---|---|
| 3,259,680 A * | 7/1966 | Schelke | B29C 45/14065 425/129.1 |
| 2005/0040557 A1* | 2/2005 | Flynn | A61M 25/0026 264/248 |
| 2008/0108243 A1 | 5/2008 | Corona | |
| 2011/0177720 A1 | 7/2011 | Cortes Roque et al. | |

FOREIGN PATENT DOCUMENTS

| | | |
|---|---|---|
| DE | 102007055319 A1 | 5/2009 |
| EP | 1441794 A2 | 8/2004 |
| JP | 277579 A | 10/1999 |

* cited by examiner

*Primary Examiner* — Edmund H Lee
(74) *Attorney, Agent, or Firm* — TAROLLI, SUNDHEIM, COVELL & TUMMINO L.L.P.

(57) ABSTRACT

The invention relates to a method for producing a cable, comprising both a molding tool with a cavity and with at least one first opening, and a line, said line consisting of at least one wire and a sheath surrounding the at least one wire. According to the invention, the line is inserted into the cavity and is guided out of the cavity via at least the first opening. A molding compound is injected into the cavity of the molding tool in a pressurized manner, wherein the line is pressed onto a seal surface of the cavity by means of the pressure of the molding compound, and the line closes the cavity at the seal surface.

9 Claims, 1 Drawing Sheet

INJECTION MOLDING AN ELEMENT ONTO A CABLE

CROSS-REFERENCE TO RELATED APPLICATION

Figure 1:
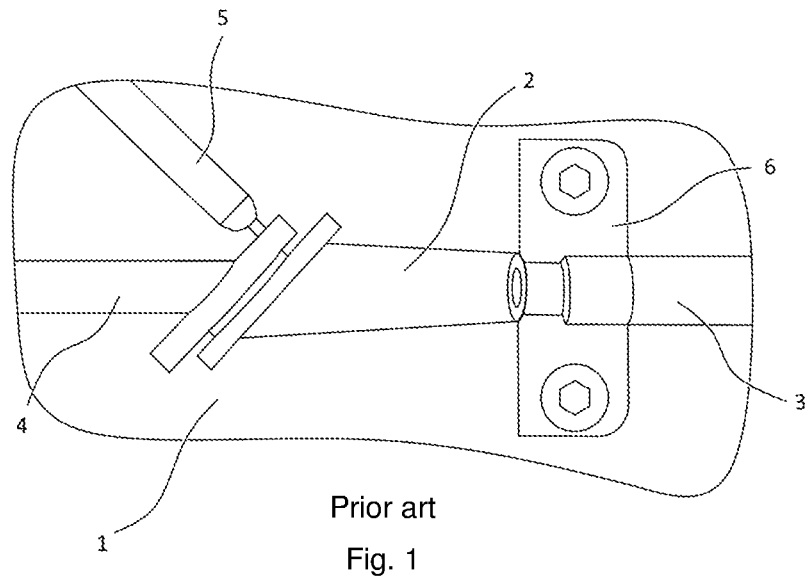

This patent application is a U.S. National Stage Application filed under 35 U.S.C. § 371 of PCT/DE2020/000007, filed Jan. 31, 2020, and entitled INJECTION MOLDING AN ELEMENT ONTO A CABLE, which International Application claims the benefit of priority from German Patent Application No. DE 102019001380.8, filed on Feb. 26, 2019. The entire contents of each of the above-identified patent applications are incorporated herein by reference.

The invention relates to a method for producing a cable, comprising both a molding tool with a cavity and with at least one first opening, and a line, said line consisting of at least one wire and a sheath surrounding the at least one wire, the line being inserted into the cavity and being guided out of the cavity via at least the first opening, and a molding compound being injected into the cavity of the molding tool in a pressurized manner.

Methods of this type are required for the further processing of lines. In these methods, lines are further processed using an injection molding process in such a way that functional elements are molded onto the line. These can be cable outlets, cable branches, or plug connectors, for example. In the past, these were attached to the line as add-on parts and, for example, screwed together.

PRIOR ART

In the prior art, however, methods are already known in which such functional elements are sprayed directly onto the line. For this purpose, lines are inserted into an injection mold before the injection molding process and then the functional element is applied to the line in the injection molding process. Any shapes for plug connectors, grommets, cable outlets, or eyelets and brackets can be molded onto a line. Depending on the materials and process data used, these functional elements hold more or less well on the line.

The aim is to create a permanent connection between the line and the functional element. Not only should a mechanically stable connection be established, but an environmentally sealed connection between the functional element and the line should also be ensured.

The transition and border region between the line and the functional element is particularly problematic. In order to create an environmentally sealed connection in this case, particularly high pressures are necessary in the injection molding process in order to make the connection as sealed as possible. On the other hand, the line must be securely fastened in the injection mold so that no material escapes from the mold at the high pressures required. This can result in unclean transitions, especially in the border region.

In the prior art, this problem is solved in that the line is fixed in the injection mold. The inserted line is screwed to one half of the injection mold by means of a fixing element and fixed therein in an environmentally sealed manner. Alternatively, a receptacle is provided in the injection mold, which is much smaller than the line itself. When the mold is closed, the line is pressed into the receptacle. For this purpose, the line is usually severely squeezed in order to ensure a secure seal. After the injection molding process, the fixing element must be removed from the mold again.

Although this method results in good quality results in terms of the sealing properties of the connection, it has two decisive disadvantages.

On the one hand, squeezing the line in the region of the fixing element creates a weak point in the cable. In the transition region, the squeezed cable expands again after being removed from the mold. This can result directly in the contour of the functional element tearing if it has not yet fully cured. In addition, a high force is exerted on the sheath of the line in the border region of the functional element when the line is bent. This can result in premature failure, breakage, and damage to the cable. A notch effect in the transition region is particularly disadvantageous in this case.

On the other hand, fixing the line in the injection mold is very complex and time-consuming. Each line to be overmolded must be manually inserted into the mold, fixed, and then removed again. Automated production is not possible. Cables produced in this way are therefore very expensive.

Problem Definition

The object of the present invention is to simplify the known process for producing cables. This should be done in particular by increasing productivity and automating the process. In addition, the mechanical disadvantages of cables produced in this way should be eliminated.

The object is achieved in that the line is pressed against a seal surface of the cavity by the pressure of the molding compound and the line closes the cavity at the seal surface.

Further advantageous embodiments of the invention are specified in the dependent claims.

The invention relates to a method for producing a cable. The method has a molding tool having a cavity, at least one first opening, and a line. The line consists of at least one, preferably at least two wires and a sheath. The sheath surrounds the wires of the line radially along the length of the line.

According to the invention, a region of the line is inserted into the cavity of the molding tool. The remaining part of the line is guided out of the molding tool via the at least one opening in the molding tool.

A particular embodiment of the invention provides that the molding tool has at least two openings. As a result, the line can be guided out of the cavity and the molding tool not only with one but with two ends. This makes it possible to use the method according to the invention in the middle of the line. It is also possible to provide the molding tool with more than two openings. For example, the line can be fanned out and a plurality of line strands can be guided out of the molding tool.

According to the present invention, a molding compound is pressed into the cavity of the molding tool by means of pressure. The molding compound preferably completely fills the cavity. The molding compound acts on the line in such a way that the molding compound displaces the line from the cavity. The line is pressed against a seal surface of the cavity. The seal surface is designed in such a way that the line closes the cavity on the seal surface and it is not possible for molding compound to emerge from the cavity. An advantageous embodiment provides that the seal surface is arranged around the first opening in the cavity.

In a particularly preferred embodiment of the invention, the line has a seal element. The seal element surrounds the line and is received in the cavity in such a way that the molding compound acts on the seal element and presses it against the seal surface of the cavity. As a result of the pressure of the molding compound, the seal element seals the cavity on the seal surface, so that no molding compound can flow into the first opening. As a result, the contact pressure of the seal element on the seal surface expediently increases linearly with the pressure. In other words, the greater the pressure of the molding compound, the greater the contact pressure of the seal element on the seal surface.

A special embodiment of the invention provides that the seal element of the line is conical. The seal element is inserted into the cavity in such a way that a thicker end of the seal element protrudes into the cavity, while a thinner end of the seal element protrudes into the first opening.

The shape of the seal surface of the cavity is expediently adapted to the seal element, so that the seal element of the line and the seal surface of the cavity interact in a form-fitting manner. In this way, a particularly good seal can be created on the seal surface. Due to the conical shape of the seal surface and the seal element, the seal element is pressed into the seal surface by the pressure of the molding compound.

A particular embodiment of the seal element also provides that the seal element is molded integrally into the sheath. This means that the seal element is produced in one piece with the cable sheath. The seal element is integrated into the cable sheath as a thickening. This advantageously makes it possible to establish a secure mechanical and environmentally sealed connection between the molding compound and the line.

In order to improve the design of the connection between the line and the molding compound even further, a further embodiment of the invention provides that the line has, at least in portions, a structure which allows a form-fitting connection to the molding compound. For this purpose, the region which is received in the cavity is designed with at least one radial thickening. This radial thickening is completely enclosed by the molding compound in the injection molding process. As a result, it is no longer possible to pull the molding compound off the line. The structure expediently adjoins the seal element on the line.

According to the invention, the method is used to form the molding compound in the cavity into a functional element on the line. The functional element can be a cable outlet or preferably a plug connector. The method is particularly suitable for forming plug connectors directly on the line in a mechanical and environmentally sealed manner. In a particularly advantageous embodiment, the seal element on the line forms the kink protection of the plug connector or the cable outlet.

The proposed method allows a particularly advantageous production of such functional elements directly on a line. In addition to particularly good mechanical properties due to the positive fit of the element on the line, a less expensive production is possible compared to methods known from the prior art. Cables produced according to the proposed method can be produced with a high degree of automation. In particular, the insertion of the line in the molding tool and the removal thereof can be automated. This is not possible in known methods. The proposed invention thus solves the disadvantages known from the prior art in a particularly advantageous manner.

EMBODIMENT

Figure 2:
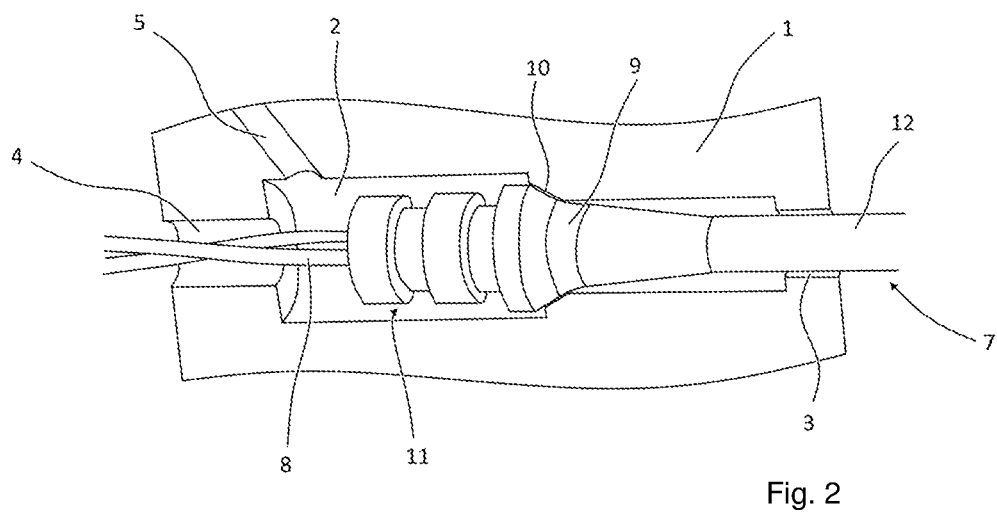

An embodiment of the invention is shown in the drawings and is explained in more detail below. In the drawings:

FIG. 1 shows a method as known from the prior art; and
FIG. 2 shows a method according to the invention.

FIG. 1 shows a method as known from the prior art. FIG. 1 shows a greatly simplified molding tool 1. Only one of the two molding tool halves is shown. The molding tool 1 has a cavity 2 which extends through the molding tool 1 and is provided for the production of a cable sleeve (not shown) with kink protection. The cable sleeve in the region shown on the left has a labyrinth seal for insertion into a housing of, for example, a plug connector. In the right-hand region, the cable sleeve merges into a tapered kink protection.

To the right of the cavity 2, the molding tool 1 has a first opening 3. The first opening 3 is provided for inserting a line into the molding tool 1. The line can be guided out of the molding tool 1 via the first opening 3 and thus have different lengths.

In order to prevent molding compound from penetrating through the first opening 3 during the injection molding process, a fixing element 6 is provided. The fixing element 6, which is designed as a bracket, is screwed to the illustrated half of the molding tool 1 by means of two screws. A line can be received under the fixing element 6 and fixed and sealed on the molding tool 1 by the fixing element 6. The fixing of the line by means of the fixing element 6 is designed in such a way that the line is pressed in between the fixing element 6 and the molding tool 1. It can thus be prevented that molding compound emerges through the first opening 3 during the injection molding process.

In the upper left region of FIG. 1, an injection channel 5 is also provided in the molding tool 1. The injection channel 5 is used to inject molding compound in the injection molding process.

A second opening 4 is also provided in the molding tool 1 to the left of the injection channel 5. The second opening 4 is used to guide the second end of a line out of the molding tool 1 and the cavity 2. This is particularly useful when a functional element, a cable sleeve, kink protection, or the like is not to be formed at one of the ends but rather in the center of a line.

FIG. 2 shows a molding tool 1 according to the method according to the invention. FIG. 2 also shows only one half of the molding tool 1. The molding tool 1 also has a first opening 3, a second opening 4, and an injection channel 5. A cavity 2 is provided in the molding tool 1 between the first opening 3 and the second opening 4.

A line 7 is inserted into the molding tool 1. One end of the line 7 is surrounded by a sheath 12 in the region shown on the right and protrudes from the molding tool 1 through the first opening 3. The second end of the line 7 is formed in the left-hand region without a sheath 12 by two wires 8 and protrudes from the second opening 4 of the molding tool 1.

In the middle region of FIG. 2, a seal element 9 is integrally molded into the sheath 12 in the cavity 2. The seal element 9 is conical and has the diameter of the sheath 12 in the right-hand region. In the left-hand region of the cavity 2, the seal element 9 becomes steadily thicker until it has almost the diameter of the cavity 2.

A step, which forms a seal surface 10, is introduced into the cavity 2. The seal surface 10 is designed in such a way that the seal element 9 rests in a form-fitting manner on the seal surface 10. By injecting molding compound according to the invention via the injection channel 5, the seal element 9 is pressed against the seal surface 10 and the penetration of molding compound into the first opening 3 is thus avoided.

In the cavity 2, the line 7 is also formed with a structure 11 which allows for a form-fitting connection with the molding compound. Due to the appropriate contour of the structure 11, a great force can advantageously be introduced from the solidified molding compound onto the line 7. This allows a particularly long service life of the connection.

The seal element 9 according to the invention is advantageously produced in one piece with the sheath 12 using a 3D printing method or comparable methods known from the prior art.

Method for Producing a Cable

List of Reference Signs

1 Molding tool
2 Cavity
3 First opening
4 Second opening
5 Injection channel
6 Fixing means
7 Line
8 Wire
9 Seal element
10 Seal surface
11 Structure
12 Sheath

The invention claimed is:

1. A method for producing a cable, the method comprising:
    providing a line including at least one wire and a sheath surrounding the at least one wire and a molding tool with a cavity and at least one first opening;
    inserting the line into the cavity to be guided out of the cavity via at least the first opening;
    injecting a molding compound into the cavity of the molding tool in a pressurized manner; and
    pressing the line onto a seal surface of the cavity by means of the pressure of the molding compound, and the line closing at the seal surface, wherein:
    the line has a seal element,
    the seal element being pressed against the seal surface of the cavity by the pressure of the molding compound, and
    the seal element being integrally molded into the sheath of the line.

2. The method according to claim 1, wherein the seal element of the line is conical.

3. The method according to claim 1, wherein the seal element of the line and the seal surface of the cavity lie against one another in a form-fitting manner.

4. The method according to claim 1, wherein the seal surface of the cavity is arranged around the first opening.

5. The method according to claim 1, wherein the line has a structure in one region, wherein the structure forms a form-fitting connection with the molding compound.

6. The method according to claim 5, wherein the structure forms at least one radial thickening along the line.

7. The method according to claim 5, wherein the structure in the cavity is enclosed with the molding compound.

8. The method according to claim 1, wherein the molding compound in the cavity forms a functional element, a cable outlet, or a plug connector.

9. The method according to claim 8, wherein the seal element forms a kink protection on the functional element, the cable outlet, or the plug connector.

\* \* \* \* \*